US010380662B2

United States Patent
Sadler et al.

(10) Patent No.: US 10,380,662 B2
(45) Date of Patent: Aug. 13, 2019

(54) PRE-VERIFICATION PROCESSING

(71) Applicant: NCR Corporation, Duluth, GA (US)

(72) Inventors: Robert F. Sadler, Cumming, GA (US);
Peter Leonard Northall, Reading (GB); Yehoshua Zvi Licht, Alpharetta, GA (US); Andrew David Monaghan, Dundee (GB); Lee Edwin Anderson, Sugar Hill, GA (US); Matthew Christopher Scott, Haslemere (GB)

(73) Assignee: NCR Corporation, Atlanta, GA (US)

(*) Notice: Subject to any disclaimer, the term of this patent is extended or adjusted under 35 U.S.C. 154(b) by 392 days.

(21) Appl. No.: 15/251,344

(22) Filed: Aug. 30, 2016

(65) Prior Publication Data

US 2018/0060928 A1    Mar. 1, 2018

(51) Int. Cl.
| | |
|---|---|
| G06Q 20/18 | (2012.01) |
| G06Q 20/20 | (2012.01) |
| G06Q 30/06 | (2012.01) |
| G06Q 20/32 | (2012.01) |
| G06K 19/06 | (2006.01) |

(52) U.S. Cl.
CPC ... *G06Q 30/0607* (2013.01); *G06K 19/06037* (2013.01); *G06Q 20/18* (2013.01); *G06Q 20/20* (2013.01); *G06Q 20/3223* (2013.01); *G06Q 20/3224* (2013.01); *G06Q 20/3274* (2013.01); *G06Q 30/06* (2013.01); *G06Q 30/0609* (2013.01)

(58) Field of Classification Search
None
See application file for complete search history.

(56) References Cited

U.S. PATENT DOCUMENTS

| | | | | |
|---|---|---|---|---|
| 5,239,480 A | * | 8/1993 | Huegel | G06Q 10/02 235/381 |
| 6,522,772 B1 | | 2/2003 | Morrison et al. | |
| 7,638,746 B2 | * | 12/2009 | Jespersen | G07D 11/0048 250/208.1 |
| 8,332,320 B2 | * | 12/2012 | Singh | G06Q 20/1085 705/1.1 |
| 8,985,440 B2 | * | 3/2015 | Pacque | G07F 17/12 235/380 |
| 9,171,295 B2 | * | 10/2015 | Burke, Jr. | G06Q 30/06 |
| 9,344,279 B2 | * | 5/2016 | Pieczul | H04M 1/72527 |
| 9,430,630 B2 | * | 8/2016 | Foster | G06F 21/34 |
| 2002/0078360 A1 | * | 6/2002 | Black | G06Q 20/10 713/176 |

(Continued)

FOREIGN PATENT DOCUMENTS

EP    2587432 A1 *  5/2013

OTHER PUBLICATIONS

Birch, D., "Second Sight: If I Created London's Best Wap Site, I'd Starve, Says Dave Birch," The Guardian,, London, Jun. 21, 2001.*

(Continued)

*Primary Examiner* — Nicholas D Rosen

(74) *Attorney, Agent, or Firm* — Schwegman, Lundberg & Woessner

(57) ABSTRACT

Unique data is obtained from a consumer; the identity data is verified for the consumer based on the unique data. A verification message is provided for at least a portion of a transaction during a transaction after the identity data is verified.

17 Claims, 6 Drawing Sheets

(56) References Cited

U.S. PATENT DOCUMENTS

| | | | |
|---|---|---|---|
| 2005/0173659 A1* | 8/2005 | Jespersen | G07D 11/0039 250/559.4 |
| 2006/0277148 A1* | 12/2006 | Thackston | G06Q 20/02 705/41 |
| 2009/0313129 A1* | 12/2009 | Rothschild | G06Q 20/04 705/17 |
| 2010/0237992 A1* | 9/2010 | Liautaud | G06K 9/0002 340/5.83 |
| 2011/0055084 A1* | 3/2011 | Singh | G06Q 20/1085 705/43 |
| 2011/0119141 A1* | 5/2011 | Hoyos | G06Q 20/20 705/17 |
| 2012/0089521 A1* | 4/2012 | Abrevaya | G06Q 20/401 705/75 |
| 2012/0203664 A1* | 8/2012 | Torossian | G06Q 30/06 705/26.41 |
| 2013/0110728 A1* | 5/2013 | Kobres | G06Q 30/06 705/75 |
| 2014/0091135 A1* | 4/2014 | Burke, Jr. | G06Q 10/20 235/375 |
| 2014/0091142 A1* | 4/2014 | Pacque | G07F 17/12 235/380 |
| 2015/0248674 A1* | 9/2015 | Han | G06Q 20/3829 705/71 |
| 2015/0254655 A1* | 9/2015 | Bondesen | G06Q 20/3821 705/72 |
| 2016/0034680 A1* | 2/2016 | Foster | G06F 21/34 726/7 |
| 2016/0080152 A1* | 3/2016 | Pieczul | H04M 1/72527 713/168 |
| 2016/0093007 A1* | 3/2016 | Richardson | G06Q 30/0611 705/80 |
| 2016/0104140 A1* | 4/2016 | Harrow | G06Q 20/18 705/42 |
| 2016/0132891 A1* | 5/2016 | MacKinnon | G06K 5/00 705/44 |
| 2016/0267340 A1* | 9/2016 | Jensen | G06K 9/00288 |

OTHER PUBLICATIONS

European Search Report dated Oct. 26, 2017 in copending European Patent Application 17186832.6.

* cited by examiner

PRE-VERIFICATION PROCESSING

BACKGROUND

As Self Service (SelfServ) sales proliferate and related devices/systems, the retail industry is facing an increasing problem of throughput efficiency and possible legal limitations being levied against certain items purchased at Self-Service Terminals (SSTs). In particular, two areas of transaction concern for retailers include: 1) age verification for certain items sales and 2) the time it takes to complete various tenders such as cash or checks. Both of these situations slow transaction throughput and decrease the Return On Investment (ROI) for the retailer who adopts SelfServ Systems.

The legal implications of purchase age for certain items (e.g., alcohol, tobacco, etc.) vary between countries/states etc., but of import is the fact that the retailer may be fined or penalized for selling to underage individuals or individuals who are not the person said to make the purchase. In addition, local governmental bodies are discussing and moving towards creation of laws that forbid retailers from selling items requiring age verification at SSTs altogether.

Furthermore, tendering increases transaction time, since tenders, such as checks, require operator assistance or in the case of cash, time to enter and dispense bills and coins. Retailers find current implementations to be inefficient as they slow transactions and throughput. Also for age, retailers have trouble ensuring that their employees follow the store procedures in place that are designed for compliance with existing legal restrictions. Another complication arises when a store operator intentionally enters invalid data to allow a purchase to be made by a friend of the operator (often referred to as "sweethearting").

Therefore, there is a need for improved identity and age verification during a purchase occurring in real time and without the need for store personnel manually verifying the purchaser's identification.

SUMMARY

In various embodiments, pre-verification processing and a Self-Service Terminal for pre-verification processing are presented.

According to an embodiment, a method for pre-verification processing is provided. Specifically, in an embodiment, unique data is obtained from a consumer. Next, identity data is verified for the consumer based on the unique data. Finally, a verification message is provided for at least a portion of a transaction during a transaction after the identity data is verified.

DETAILED DESCRIPTION

Figure 1A:
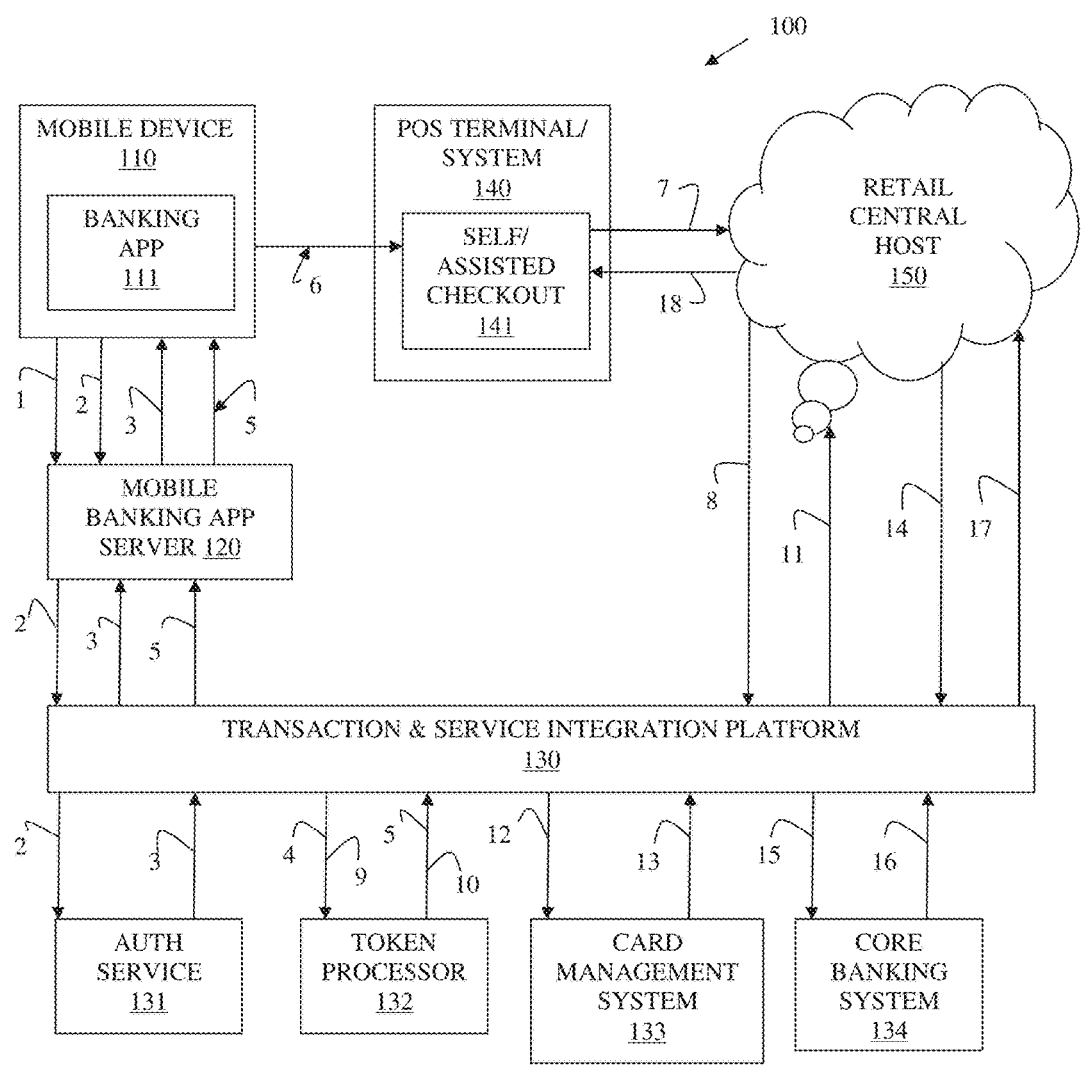
FIG. 1A is a diagram of a system for pre-verification processing, according to an example embodiment.

FIG. 1A is a diagram of a system 100 for pre-verification processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the pre-verification processing techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for pre-verification processing can be implemented in all, or some combination of the components shown in different hardware computing devices having one or more hardware processors.

The system 100 includes: 1) a mobile device 110 operated by a consumer and having a mobile banking application 111, 2) a mobile banking app server 120, 3) a transaction and service integration server (cloud) platform 130 having an authentication service 131, a token processor 132, a card management system 133, and a core banking system 134, 4) a Point-Of-Sale (POS) system 140 including a plurality of SSTs/cashier-assisted checkout terminals 141 (hereinafter SST 141), and 5) a retail central host/system 150.

For illustrative purposes, the discussion that follows assumes a customer (user or consumer) is making a purchase of an item at the SST 141 that conventionally would require manual identification of the customer by a clerk of a retailer associated with the SST. It is to be noted that other scenarios can exist where conventionally manual identification of the customer is required, and such other scenarios may still utilize the teachings presented herein (such as manual verification at a cashier assisted terminal, cash checking (where no item is actually being purchased by the customer), and the like).

The customer operates the mobile device 110 to access a mobile banking application (app) 111 that executes on the mobile device 110. The customer interacts with the banking app 111 interface to initiate a login in 1 to banking services of the customer with the customer's bank. It is noted that, typically, as soon as the customer selects the mobile app 111 from an interface of the mobile device 110, the mobile app's interface requests that the customer login and may tentatively establish a network connection to the mobile banking app server 120. The login interface screen identifies fields that require the customer to enter that customer's banking user identifier (ID) and password (credential(s)) or other equivalent login processes including consumer biometrics and/or PINs. The ID and credential(s) are then passed over the network connection between the mobile device 110 and the banking host in 2.

The mobile banking app server 120 relays the ID and credentials (still in 2) to the transaction and service integration platform 130, and the ID and credentials are forwarded to an authentication service 131 (still in 2) that authenticates the login session (initiated back in 1) between the mobile device 110 and the core banking system 134 (and passing through the transaction and service integration platform 130).

If the customer provides an incorrect combination of the ID and credential(s), then the login session is denied. For purposes of the discussion that follows, it is assumed that the customer provides a valid combination of the ID and credential(s), which are successfully authenticated by the authentication service 131.

The authentication service 131 then passes a message back in 3 indicating that authentication of the customer was successful, which passes back through the transaction and service integration platform 130 and the mobile banking app server 120 to the banking app 111 of the mobile device 110.

Simultaneous to 3, the transaction and service integration platform passes the customer ID and the authenticated message to the token processor 132 in 4. The token processor generates a token from the customer ID based on the authenticated message. The token includes a limited Time-To-Live (TTL) attribute, meaning that after a pre-configured period of time from when the token processor generates the token, the token will be identified as being revoked or no longer valid for use. The token is passed up through 5 to the transaction and service integration platform 130 where it is forwarded through the mobile banking app server 120 to either: the banking app 111 or to another app processing independent of banking app 111 on the mobile device 110 (such as but not limited to a text message application, an email messaging application, and the like). So, the customer has access to the token from the mobile device 110 in 5 through the banking app 111 (in-band token delivery through the login session) or through a messaging app processing on the mobile device 110 that is independent of the banking app 111 (out-of-band token delivery outside the login session).

Access to the token from the mobile device 110 provides a mechanism by which the customer can verify the identity including age of the customer with the SST 141 for a transaction that requires identity verification by the customer (such as age verification for purchase of items requiring age verification and such as check cashing for dispensing case to the customer from the SST 141).

The core banking system 134 has access to the customer's private details, such as birthdate. The token processor 132 can include some or some portion of the customer's private details in the generated token. This may be particularly useful when the transaction requires auditing details for governmental compliance of transactions requiring age verification by the retailer. The token processor 132 can obtain such details for production in the token through the core banking system 134 using the customer ID and the authentication message as provided by the transaction and service integration platform 130. It is noted that such details may not be needed for compliance requirements and therefore, in some embodiments, such details need not be included in the token by the token processor 132.

In fact, what is needed for verification from the customer can vary in many different ways based on the legal requirements imposed on the retailer at the location of the SST 141, existing retailer internal procedures, and/or the item being purchased at the SST 141 and/or the type of transaction being conducted at the SST 141.

When additional verification details are needed, a modified and enhanced version of the banking app 111 or a separate independent app may obtain these verification details during 2. This can be done in a variety of manners.

For example, the banking app 111 may be modified to provide an option to verify the customer's identity and/or age, which the customer selects in 2. Based on a current location resolved for the mobile device 110 by the banking app 111, the banking app 111 through communication with the transaction and service integration platform 130 obtains a policy that defines what is needed to verify the customer's identity and/or age for that current location (this can be preconfigured based on location and retailer identifier). The details of what is needed is then obtained from the customer in 2. This can include a variety of details, such as facial recognition of the customer taken from the mobile device 110, an image of a government issued identification card taken by the mobile device 110 when presented by the customer (such as driver's license, passport, etc.), a finger print of the customer (again taken by the mobile device 110 through a fingerprint reader), a scan of the customer's bankcard by the mobile device 110 when presented by the customer for scanning, a Personal Identification Number (PIN) registered by the customer for using the bankcard, a social security number (SSN) entered by the customer, and others. In some cases, the policy may require the customer through the banking app 111 to provide in 2 more than one of the details listed above for authentication.

The details are then provided with the original ID and credentials in 2 for which the authentication service 131 authenticates and provides the authentication message in 3 and simultaneously communicates that authentication message over the transaction and service integration platform, which permits the token processor 132 to generate the token provided back in 5 to the mobile device. Again, for compliance reasons the token processor 132 may include (encoded) in the token what forms of details were verified from the customer. For instance, the token may include an encoded driver's license number for the customer.

Once the token is generated, the customer has a limited amount of time (based on the TTL attribute of the token) to conclude the customer's transaction at the SST 141. Assuming TTL attribute has not expired, the customer provides the token in 6 during a transaction. The token can be provided before the transaction is initiated on the SST 141 or when the SST 141 during the transaction detects the scan or purchase of item that requires the customer's age be verified or detects that an option has been initiated on the SST 141 requiring the customer identity be verified (such as an attempt to cash a check by the customer). The token can be delivered from the mobile device 110 to the SST 141 in a variety of manners.

For example, the customer may use the banking app 111 or an independent app executing on the mobile device 110 to display the token within a screen on a display of the mobile device 110 (such as a barcode, QR code, or other similar token mechanism) and present the token from the display to a scanner of the SST 141 for scanning. In another case, the customer may activate a Near Field Communication (NFC) application on the mobile device 110 and tap an NFC reader of the SST 141 to communicate the token.

The token is communicated from the SST 141 through the POS terminal system 140 to the retailer's central host system or server 150 in 7. The central host 150 recognizes the token format and is configured to forward the token with a token verification request in 8 to the transaction and service integration platform 130.

The transaction and service integration platform 130 provides the token to the token processor in 9. The token processor 132 verifies that the token is a valid issued token that the token processor 132 issued and that the token's TTL attribute has not yet expired. Assuming this to be the case, the token processor 132 sends a verification message in 10 back to the transaction and service integration platform 130. The transaction and service integration platform 130 sends the token verification message back to the retail central host 150 in 11. The retail central host 150 sends an authentication message or an override message back to the SST 141, which instructs the SST 141 to proceed with the transaction with the customer's identity and/or age being verified.

The customer then proceeds with the transaction at the SST 141, and optionally, the customer may provide a credit card, loyalty card, and/or bank card for payment or for loyalty credit associated with the transaction. The transaction details are sent as a transaction request in 7 from the SST 141 to the retail central host 150. Any loyalty, credit card, or bank card that needs processing for the transaction is sent in 14 to the transaction and service integration platform 130 and forwarded for transaction verification (or loyalty processor and/or payment processing) in 12 and/or 15. Appropriate verification for this card and/or payment processing is provided back to the transaction and service integration platform 130 in 13 and/or 16. The card processing verification is sent from the transaction and service integration platform 130 to the retail central host 150 in 17. The retail central host 150 sends the card processing verification back to the SST in 18 to conclude the customer transaction.

The system 100 demonstrates how customer identity and age verification can be achieved in a completely automated manner without requiring any manual intervention and in complete compliance with any government issued requirements.

In an embodiment, the age verification requires nothing more than authentication with the core banking system 134 through the banking app to generate the token used for age verification (and any secondary optional verification) during the transaction by the customer at the SST 141.

In an embodiment, the token is produced in a Quick Response (QR) code format.

In an embodiment, the token is produced in a barcode or QR codeformat.

In an embodiment, the token is produced in a NFC format.

Figure 1B:
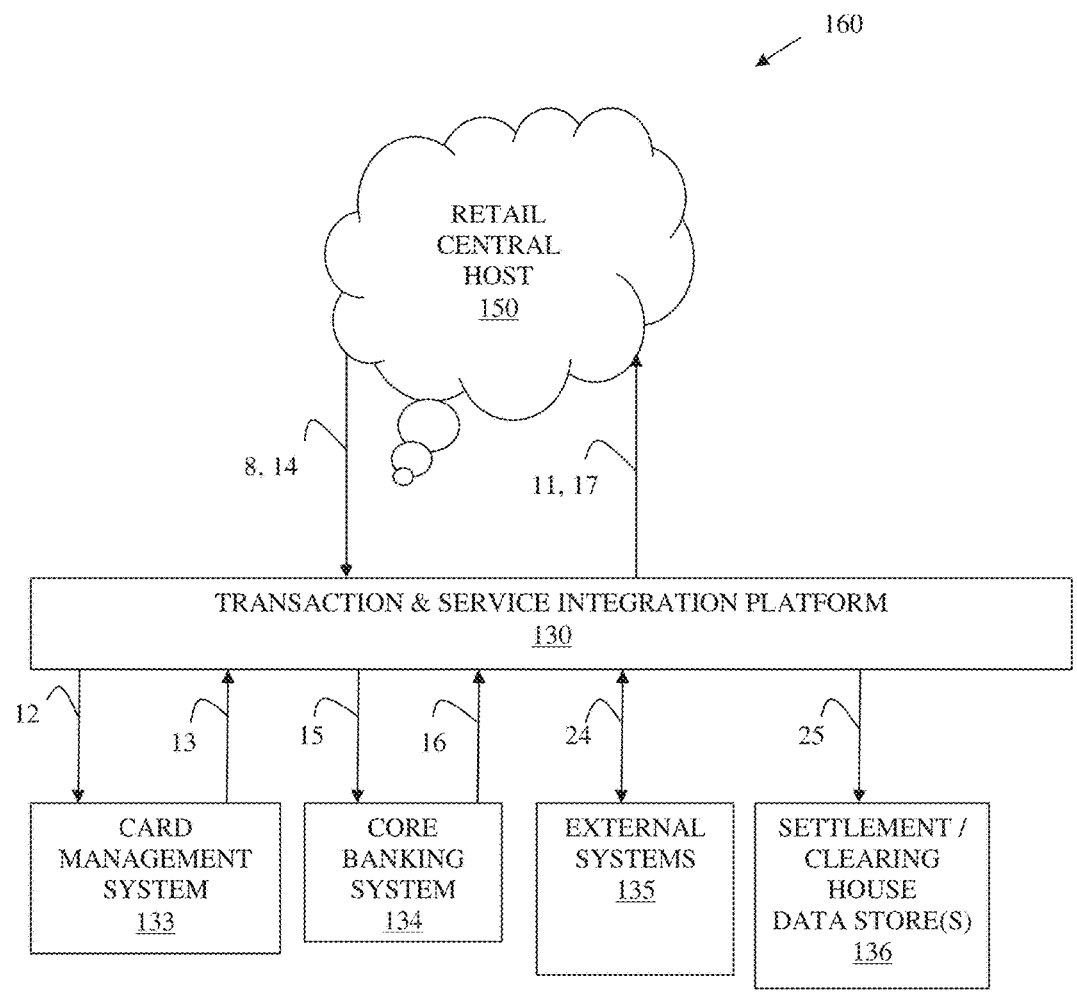
FIG. 1B is a diagram of another system for pre-verification processing, according to an example embodiment.

FIG. 1B is a diagram of another system 160 for pre-verification processing, according to an example embodiment.

The system 165 illustrates a variation and in some cases an enhancement to the age/identification processing discussed in the FIG. 1A.

The system 165 again illustrates the functionality of using a core banking system 134 for pre-verification of age/identity processing in advance of a POS transaction in flows: 8 and 11-17. However, the system 165 also illustrates external systems 135 and a settlement/clearing house data store 136 with enhanced flows 24 and 25, which was not specifically illustrated in the FIG. 1A.

The settlement/clearing house data store(s) 135 in 25 illustrates that the transaction and service integration platform can use an interface or Application Programming Interface (API) calls to provide data about the age/identity verification processing for a given transaction and transaction details to specific retail settlement data stores 136 and to clearing house data stores 136. This allows for downstream processing, transaction verification, and ledger balancing with these separately maintained systems and data stores 136.

The external systems 135 can be a variety of governmental or retail systems having an API interface that permits verification of a consumer for age/identity. For example, suppose during a transaction a consumer lacks a driver's license during checkout with a POS terminal, but the user-operated mobile device 110 includes fingerprint capturing (as most phones currently do through a fingerprint reader or touch screen analysis).

The transaction and service integration platform 130 is aware of the location of the mobile device 110 at or in the vicinity of a particular retailer and a self/assisted checkout 141. This can be done through: 1) automatic reporting by a mobile app executing on the mobile device 110; 2) triangulating the mobile device 110 with wireless beacons of a specific retailer; 3) manual consumer reporting through an interface of the mobile app, and other mechanisms.

Once the transaction and service integration platform 130 is aware of locale (location and governmental regulations/laws for identification (which can be pre-defined in tables for identification based on the location of the mobile device 110) and once the transaction and service integration platform 130 is aware of the retailer where the transaction is to occur (again using pre-defined tables accessed by the transaction and service integration platform 130), the transaction and service integration platform 130 can identify what the local government and local retailer associated with the transaction requires for age/identity verification for a consumer.

The transaction and service integration platform 130 can then utilize API calls to interact with the POS terminal 141 and/or can interact with the mobile app 111 for purposes of automatically and without manual intervention verifying the age/identity of the consumer for a transaction.

For example, the app 111 (through API calls made by the transaction and service integration platform 130) can instruct the consumer to take a picture of the consumer's government issued id (driver's license, passport, etc.) and, perhaps also take a picture of the consumer through a camera of the mobile device 110. The photo on the consumer provided government id can be processed through Optical Character Recognition (OCR) for obtaining a valid expiration date, issued data, and government issued identifying number for the id. In some cases, the government photo on the government issued id can also then be optically compared to the real-time photo of the consumer (such as through extraction of feature pixels and scoring to determine a match between the consumer photo and the governmental id photo). Once a confirmation is made, the processing of the transaction and service integration platform for generating the short-lived token for the transaction that validates the age/identity of the consumer can take place in the manners discussed above in the FIG. 1A.

As another example, consider that the consumer lacks a government issued id that is required either by the local governmental authority for the transaction or by the local retailer associated with the POS terminal 141. Here, the consumer may indicate through the app interface of app 111 that such government issued id is not in the possession of the consumer or perhaps the consumer would just prefer not to extract the id and display it to the mobile device 110 in the consumer's present setting at the retailer. In response, the transaction and service integration platform 130 can provide an alternative mechanism for obtaining the needed governmental details of the governmental issued id of the consumer (the alternative mechanism can be pre-configured in the transaction and service integration platform 130 based on existing interfaces and features that the transaction and service integration platform 130 is aware of with respect to interfaced external systems 135).

For example, the alternative mechanism may be identified as an ability to search a public records data store that houses driver licenses for consumers in the particular local with a finger print of the consumer. A preconfigured table with governmental data sources and required types of information may be accessible to the transaction and service integration platform 130 for recognizing that the alternative mechanism can be a finger print of the consumer. The transaction and service integration platform 130 instructs the mobile app 111 to request that the consumer place a finger on the mobile device's fingerprint reader, the app 111 transmits the fingerprint reading (or the entire image of the fingerprint) back to the transaction and service integration platform 130, and the transaction and service integration platform 130 accesses a search interface to access the appropriate governmental data system 135 having the appropriate governmental data sources for matching a fingerprint search with driver license data, and the transaction and service integration platform 130 issues the fingerprint search of the consumer. In response, the governmental system 135 returns the driver license details for the consumer's driver license back to the transaction and service integration platform 130 as results of the fingerprint search. The transaction and service integration platform 130 then performs the token generation and processing discussed above with the FIG. 1A for providing age/identity verification in advance of the transaction with POS terminal 141.

A variety of external systems 135 can be deployed with the transaction and service integration platform 130 including but not limited to: social security data, bank data (for specific banks for use of a consumer presented bankcard and PIN as age/identity verification), passport data, property records (mortgages, liens, property sales), corporate filings, and the like. The alternative mechanism selected by the transaction and service integration platform 130 can be based on what external systems 135 are available to the transaction and service integration platform 130 and what is required for age/identity verification for a given transaction at a given locality-specific retailer for that transaction.

The FIG. 1B illustrates that age/identity consumer pre-verification for a given locality specific retailer can be automatically processed in advance of a transaction through processing of: 1) a consumer's bank information through the consumer's banking app, 2) a variety of information or cards provided by the consumer that are specifically required for the transaction, and/or 3) a variety of information or cards provided by the consumer that permits the transaction and service integration platform 130 to interact with one or more external systems 135 to obtain information specifically required for the transaction.

It should also be noted that this identity-based information does not have to be held or stored by the transaction and service integration platform 130 for any transaction; rather, the identity-based information remains in its native repositories and systems 135 and 136 and obtained dynamically and in real time by the transaction and service integration platform 130 as needed for any given transaction.

In an embodiment, the transaction and service integration platform 130 is configured to gather the needed identity information for age/identity pre-authentication from a plurality external systems 135. For example, one system 135 may provide a piece of the identity-based information needed for pre-verification and that piece can be used for accessing a second system 135 to obtain a second piece of identity-based information needed for pre-verification. Or, the needed identity-based information may only be obtained by an external system 135 with a specific type of information and the specific type of information is obtained by the transaction and service integration platform 130 through a different external system 135 using what is provided by the consumer. That is, the workflow for interacting with the external systems 135 can be preconfigured in tables that the transaction and service integration platform 130 accesses based on what identity-based information is required for a given transaction, the available external systems 135, and what the consumer can actually provide or does provided through the mobile device 110 for the pre-verification processing.

In an embodiment, the system 160 also illustrates that the token processing can be optional and interaction for pre-verification of age or identity can occur through the transaction and service integration platform 130 and the retail central host 150 (which directly interacts with a POS terminal 141, such as a Self-Service Terminal 141). In other words, the consumer can be identified that a purchased item or tendered item (check for cashing) requires additional age or identity verification and rather than initiating a manual review by a clerk at that SST 141, the processing described above can be performed in cooperation with the SST 141 (in the manners discussed above with the consumer's mobile app 111). In this scenario, the token processing can be dispensed with and only a verification message provided through the transaction and service integration platform 130 and the retail central host 150 to the SST 141 indicating that the verification was successful or unsuccessful for the item purchase or the tendered item.

Figure 1C:
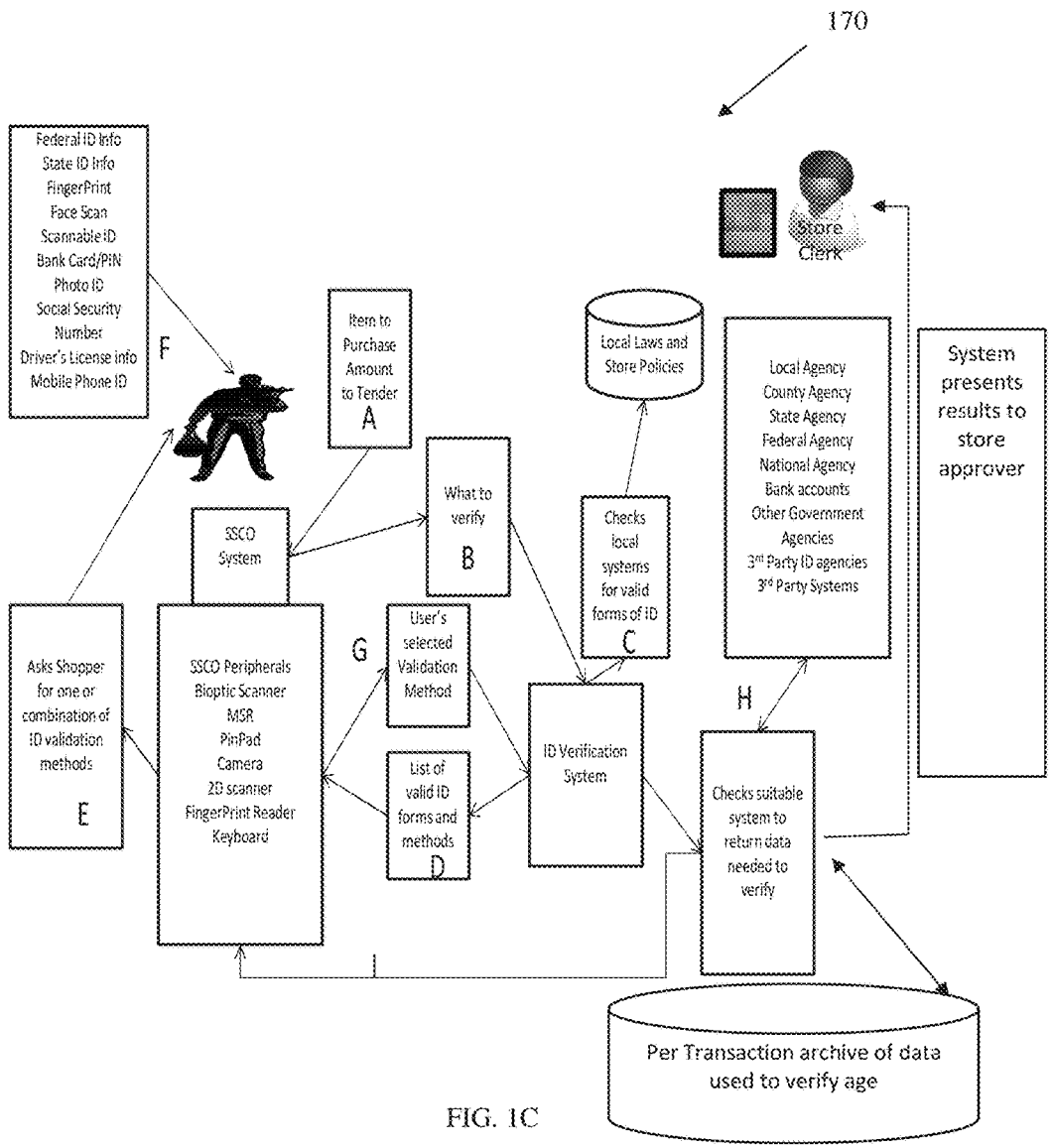
FIG. 1C is a diagram illustrating an example process flow for pre-verification processing, according to an example embodiment.

FIG. 1C is a diagram illustrating an example process flow 170 for pre-verification processing, according to an example embodiment.

The FIG. 10 provides a sample set of scenarios that include a variety of hardware devices, types of identity/age information, and external systems and the interaction of these components for performing pre-verification of a consumer's identity/age for a transaction with a POS terminal 141. The underlying hardware devices and techniques for achieving this sample set of scenarios was presented above with the discussion of the FIGS. 1A-1B.

Initially, at A, a user (consumer/customer) scans an ID restricted item (age) or wants to tender without physical media (cash, check, or card) for receipt of cash.

The Self-Service Check Out (SSCO 141) passes, at B, transaction data to ID verification system (100 and/or 160).

The ID verification system (100 or 160) checks for valid forms of ID that would legally permit the transaction to continue, at C.

The ID system (transaction and service integration platform 130) returns a list of possibilities to the SSCO system (140 and/or 150), at D.

The SSCO system (140 and/or 150) based on its hardware configuration presents the list or a subset to the user for consideration, at E.

Based on what the shopper (user) has available, she/he indicates to SSCO (141) and the system (transaction and service integration platform 130) collects that information, at F. This could be a fingerprint scan, a photograph of the person, a signature, or combination of several items.

Data is passed from SSCO (141) to the ID system (transaction and service integration platform 130), at G.

ID system (transaction and service integration platform 130) checks with various configured agencies and databases (external systems 135) to confirm the various system supplied data can be positively and legally bound to the shopper (user) and returns age and ID information to SSCO 141. SSCO 141 uses data to allow transaction, at H.

The FIG. 1C also illustrates that the pre-verification of Identity and/or age can occur at a POS terminal 141 during a self-checkout being performed by the shopper (user/customer/consumer). The previous discussions (mostly) utilized a token-based approach and the mobile device 110 of the consumer, but that processing can be moved to the POS terminal 141 and the token (in some embodiments) eliminated with a simple verification message of verified or not verified sent from the transaction and service integration platform 130 to the POS terminal 141 (SSCO 141). It is also noted that interaction between the SSCO 141 (SST 141) and the consumer's mobile device 110 can also be utilized in this processing (for example a fingerprint reading can be communicated from the mobile device 141 (through the mobile app) to the SSCO 141). So, although no mobile device 110 interaction is needed for the pre-verification at the SSCO 141, in some embodiments, that interaction can still be used. Still further, although the approach discussed in the FIGS. 1B and 10 do not have to require the token processing discussed with the FIG. 1A, a token may, in some embodiments, still be utilized between the transaction and service integration platform 130 and the retail host 150 (this may be useful when the token includes compliance audit data that is housed in a retail data store 136 for compliance and auditing purposes).

So, in some embodiments the pre-verification can occur without a token and without any mobile app of the consumer and can be achieved entirely on the SSCO 141 through interaction with the POS system 140, the retail central host 150, and the transaction and service integration platform 130.

In an embodiment, the unique data is collected from a variety of sources and batched based on a particular consumer and then automatically presented to a store employee for remote visual verification. This can be used when legal requirements still mandate a manual visual inspection.

In an embodiment, the unique data and mechanism for validating the consumer identity is logged in a data store by transaction for providing evidence of compliance in the event of a legal challenge levied against a particular transaction decision.

In an embodiment, a scan of the consumer's face is pre-scanned upon enter a store, by the consumer's mobile application when the consumer's mobile device is detected in the vicinity of the store, or by network cameras situated at the entrance or near the POS terminal. The face image of the consumer is then pre-looked up for identity verification before the consumer even engages in a transaction requiring identity or age verification. This can be done without the consumer having to pre-operate his mobile device or perform any action at all. This may also be verified once pre-verification is achieved manually by remote store personnel that compares the store captured image of the consumer against known verifiable sources for images of the consumer.

The various embodiments and description above, with respect to the FIGS. 1A-1C permit pre-verification of a consumer's identity and/or age when purchasing an item or tendering an item at a retailer's SST 141 and/or Cashier-Assisted Terminal 141 for providing automated verification for the item being purchased or tendered. Research studies have shown that the time it takes on average to manually verify identity/age is approximately 63.54 seconds. The techniques herein substantially reduce that average time to a few seconds or less. For large retailers, this time reduction can result in substantial cost savings in terms of personnel and transaction throughput at POS terminals 141 (both SSTs 141 and Cashier-Assisted Terminals 141). Transaction throughput also improves customer satisfaction with a retailer.

Existing approaches have attempted to deal with items that require additional verification in a number of manners, such as: 1) having a store employee do a visual inspection of a consumer-presented ID that the employee manually enters into a SST or POS terminal; 2) attempting to use a camera attached on or near a POS terminal that takes a picture of the consumer and then later asks the consumer to present a picture ID that is compared to the captured photo of the consumer; and 3) registration with a particular retailer of a consumer's fingerprint and government issued ID, which is then compared with the store data to verify the consumer at a checkout.

The techniques presented here improve on prior techniques in the following manners:

With respect to the existing approach of 1) above, the techniques herein substantially improve transaction times, reduce employee introduced error, and reduce employee introduced deceit (sweat hearting). Existing approach 1) must signal to the operator visual verification is required. The operator may not notice or be able to comply immediately, which adds time to transaction throughput. Related to this, the operator being busy or poorly trained may attempt to 'guess' at the age or identity of the person and submit inaccurate information. Finally, the operator can enter false information to allow an accomplice to purchase items illegally (sweet hearting). The techniques presented herein require no operator intervention and the delayed time for the above-discussed processing to be performed is achieved in a time-frame that is similar for the elapsed time that it takes to perform a debit transaction (a few seconds or less).

With respect to existing approach 2), 2) is more expensive to implement that existing approach 1) and 2) still relies on human intervention (albeit remote which may not increase throughput). Existing approach 2) may also require real time voice communication to ask the purchaser additional questions, which adds to bandwidth needs and elapsed transaction time. The techniques presented herein allow for collection of multiple items and also allow tender transactions to occur without media being present.

With respect to existing approach 3), 3) offers automation and addresses the problem in terms of time and fraud. However, it requires a purchaser to have been "pre-approved" by the retailer's implemented system. This limits the number of people who will choose to do this and hence while effective for those who do, does not cover all cases thus requiring the retailer to use one of the other existing approaches (1 or 2 above), which increases costs and complexity to maintain 3) and numerous approaches to keep current (1-3). Also, a purchaser may have to sign up for numerous systems, which is tedious and decreases the chance of widespread usage. The techniques herein utilize existing systems already in existence to validate information the user provides. That is the techniques herein do not store, maintain, and manage, private identity data for the consumer; the identity data is obtained dynamically and in real time on a per-transaction bases as needed from existing external systems that already has the identity data for the consumer, which means that the techniques presented herein are more secure than existing approach 3) where a consumer's identity data is registered, stored, and managed at a particular retail system, which could be compromised and expose the consumer to identity theft.

The embodiments presented in the FIGS. 1A-1C and other embodiments are now discussed with reference to the FIGS. 2-4.

Figure 2:
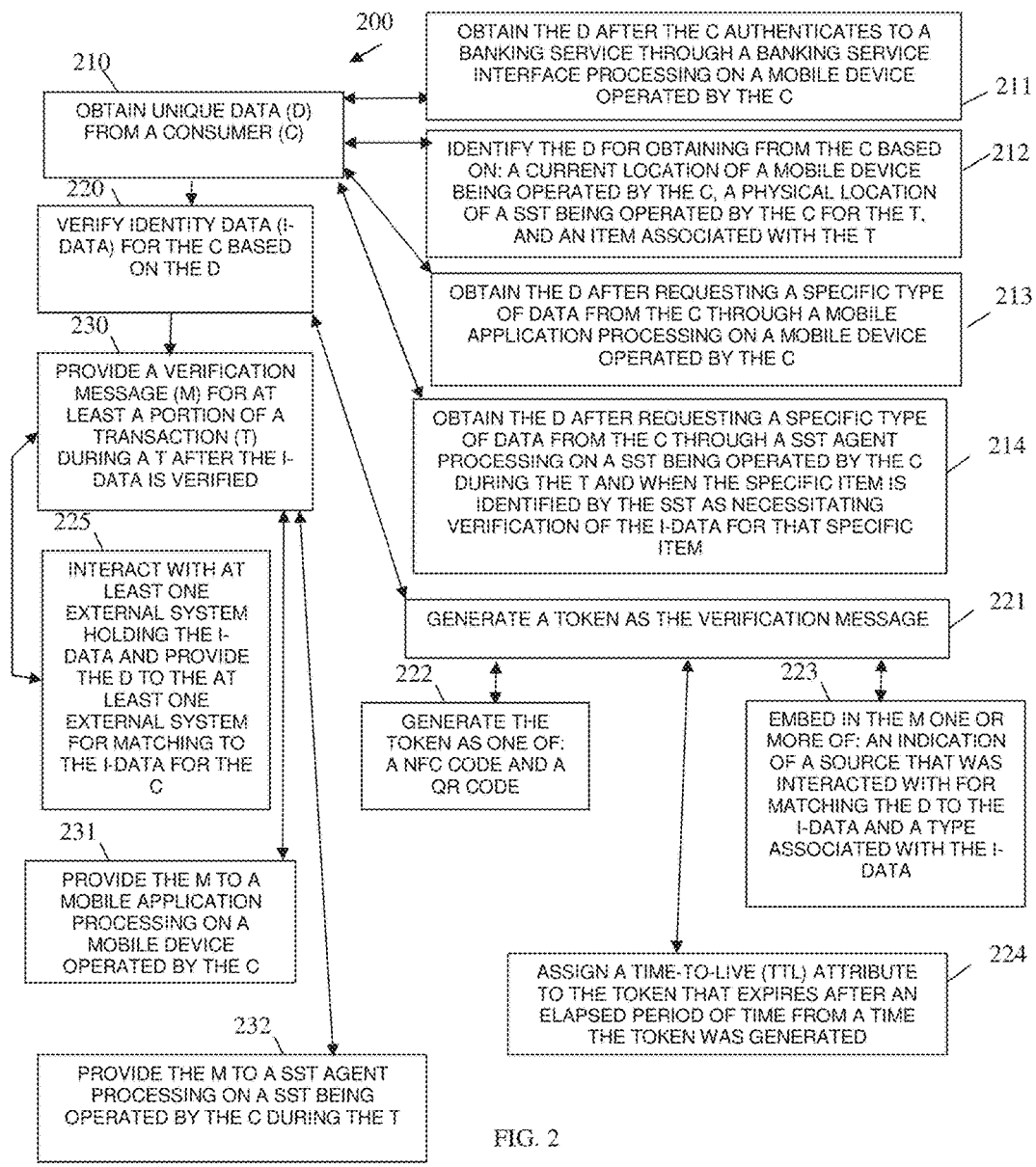
FIG. 2 is a diagram of a method for pre-verification processing, according to an example embodiment.

FIG. 2 is a diagram of a method 200 for pre-verification processing, according to an example embodiment. The software module(s) that implements the method 200 is referred to as an "identity verifier." The identity verifier is implemented as executable instructions programmed and residing within memory and/or a non-transitory computer-readable (processor-readable) storage medium and executed by one or more hardware processors of a hardware computing device. The processors of the device that executes the identity verifier are specifically configured and programmed to process the identity verifier. The identity verifier has access to one or more networks during its processing. The networks can be wired, wireless, or a combination of wired and wireless.

In an embodiment, the device that executes the identity verifier is the device or set of devices that process the transaction and service integration platform 130.

In an embodiment, the device that executes the identity verifier is a collection of devices.

In an embodiment, the devices that execute the identity verifier is a cloud processing environment.

In an embodiment, the devices that execute the identity verifier are the same devices that execute a specific retailer's central host, such as host 150.

In an embodiment, the identity verifier is the processing discussed above with respect to the transaction and service integration platform 130.

In an embodiment, the identity verifier is a combination of the processing discussed above with respect to the transaction and service integration platform 130, the retail central host 150, the POS system 140, and the POS terminal 141.

At 210, the identity verifier obtains unique data from a consumer. The unique data can include a variety of types of information, such as but not limited to: a fingerprint, a facial scan, a biometric reading, a photograph of a face of the consumer, a photograph of a government issued ID card, a photograph or scan of a consumer card (loyalty card (which can lead to unique data such as an independent photograph of the consumer that gets compared to a current photogram of the consumer at the POS terminal), credit card, bank card, etc.), or various combinations of these things. In an embodiment, at least some of the unique data is generated or captured by the mobile device operated by the consumer (such as a face print, a fingerprint, etc.).

In an embodiment, at 211, the identity verifier obtains the unique data after the consumer authenticates to a banking service through a banking service interface processing on a mobile device operated by the consumer (such as banking app 111 and mobile device 110 and as described above in the description of the FIG. 1A).

In an embodiment, at 212, the identity verifier identifies the unique data for obtaining from the consumer based on: a current location resolved for a mobile device being operated by the consumer, a physical location of a SST being operated by the consumer for the transaction, and an item associated with at least a portion of the transaction.

In an embodiment, at 213, the identity verifier obtains the unique data after requesting a specific type of data from the consumer through a mobile application processing on a mobile device being operated by the consumer. For example, the specific type of data may be a photograph of the consumer's driver's license or any of the other types of data discussed above in the FIGS. 1A-1C.

In an embodiment, at 214, the identity verifier obtains the unique data after requesting a specific type of data from the consumer through a SST agent processing on a SST being operated by the consumer during the transaction and when a specific item is identified by the SST as necessitating verification of the identity data from that specific item.

At 220, the identity verifier verifies identity data for the consumer based on the unique data. The identity data can include such things as, and by way of example only, driver's license details, passport details, age of the consumer, social security number of the consumer, and the like.

According to an embodiment, at 221, the identity verifier generates the verification message (discussed at 230 below) as a token.

In an embodiment of 221 and at 222, the identity verifier generates the token as one of a NFC code and a QR code.

In an embodiment of 221 and at 223, the identity verifier embeds in the verification message (token) one or more of: an indication of a source that was interacted with for matching the unique data to the identity data and a type associated with the identity data.

In an embodiment of 221 and at 224, the identity verifier assigns a TTL attribute to the token that expires after an elapsed period of time from a time that the token was originally generated by the identity verifier.

In an embodiment, at 225, the identity verifier interacting with at least one external system holding the identity data and providing the unique data to the at least one external system for matching to the identity data for the consumer. In an embodiment, the at least one external system is the external system(s) 135 and as discussed above with the FIGS. 1B and 1C.

At 230, the identity verifier provides a verification message for at least a portion of the transaction during the transaction and after the identity data is verified.

According to an embodiment, at 231, the identity verifier provides the verification message to a mobile application processing on a mobile device operated by the consumer. The consumer can then operate the mobile device to communicate the verification message to the SST that is conducting the transaction (communication can occur in a number of manners, such as, by way of example only, a QR or barcode scan, and NFC tap, and the like).

In an embodiment, at 232, the identity verifier provides the verification message to an SST agent processing on a SST being operated by the consumer during the transaction. Contrasted with the embodiment of 231, this embodiment directly provides the verification message to the SST where the transaction is being conducted for the consumer.

Figure 3:
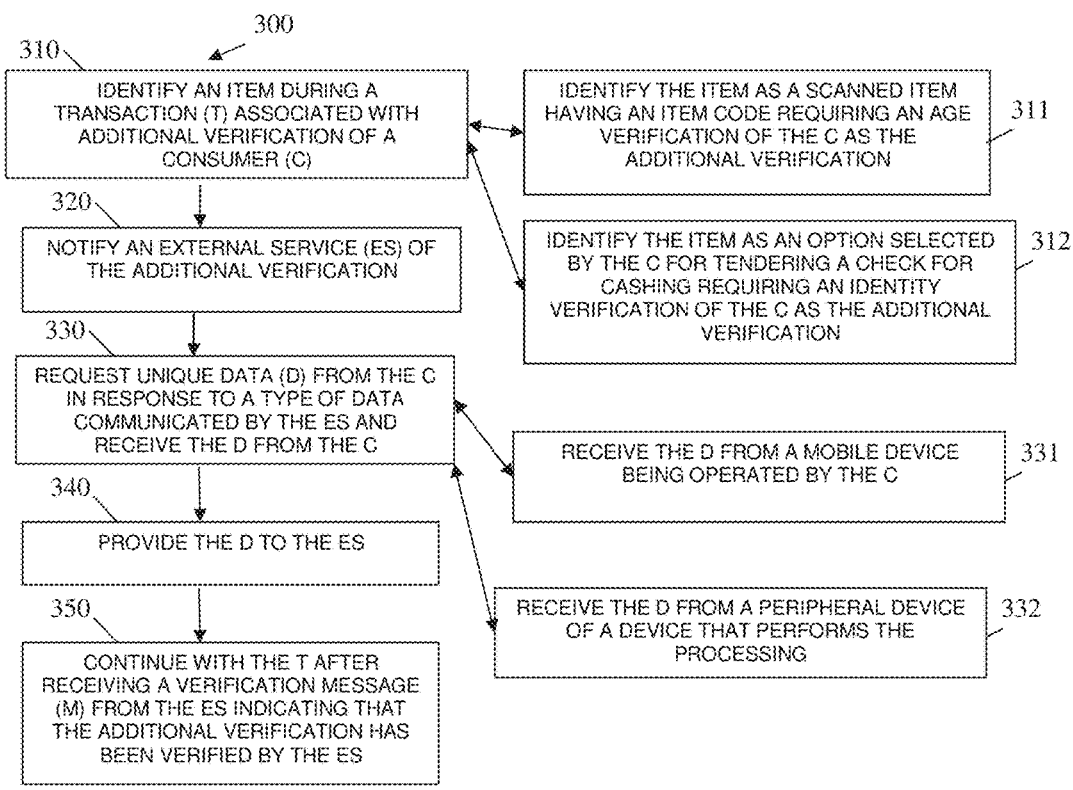
FIG. 3 is a diagram of another method for pre-verification processing, according to an example embodiment.

FIG. 3 is a diagram of another method 300 for pre-verification processing, according to an example embodiment. The software module(s) that implements the method 300 is referred to as a "SST agent." The SST agent is implemented as executable instructions programmed and residing within memory and/or a non-transitory computer-readable (processor-readable) storage medium and executed by one or more hardware processors of a hardware device. The processors of the device that executes the SST agent are specifically configured and programmed to process the SST agent. The SST agent has access to one or more networks during its processing. The networks can be wired, wireless, or a combination of wired and wireless.

In an embodiment, the device that executes the SST agent is the SST 141.

In an embodiment, the SST agent interacts with the method 200 of the FIG. 2.

In an embodiment, the SST agent interacts with the retail central host 150.

In an embodiment, the SST agent interacts with a combination of the retail central host 150 and the transaction and service integration platform 130.

At 310, the SST agent identifies an item during a transaction associated with needing additional verification of the consumer for which the transaction is occurring with.

According to an embodiment, at 311, the SST agent identifies the item as a scanned item having an item code that requires an age verification of the consumer as the additional verification.

In an embodiment, at 312, the SST agent identifies the item as an option selected by the consumer for tendering a check for cashing and requiring an identity verification of the consumer as the additional verification.

At 320, the SST agent notifies an external service of the additional verification that is needed for the item during the transaction.

At 330, the SST agent requests unique data from the consumer in response to a type of data communicated by the external system as being needed. Also, at 330, the SST agent receives the unique data of the type from the consumer.

According to an embodiment, at 331, the SST agent receives the unique data from a mobile device being operated by the consumer.

In an embodiment, at 332, the SST agent receives the unique data from a peripheral device of the SST (device) that processes the SST agent (method 300).

At 340, the SST agent provides the unique data received from the consumer back to the external system.

At 350, the SST agent continues with the transaction after receiving a verification message from the external system indicating that the additional verification has been verified by the external system.

Figure 4:
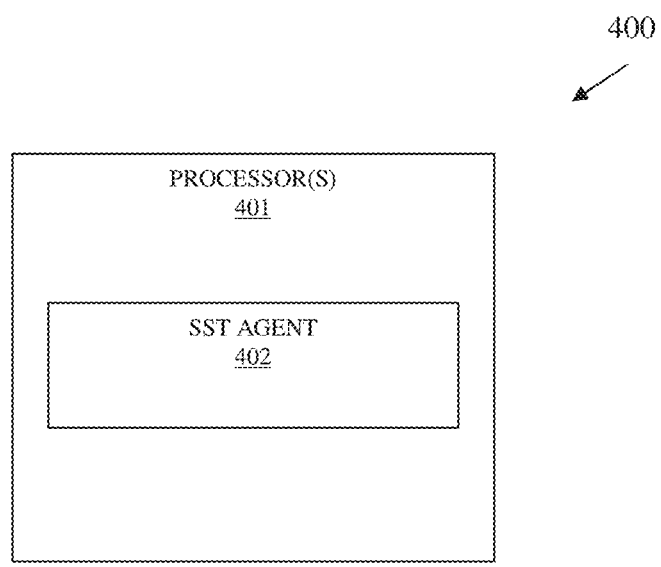
FIG. 4 is a diagram of a Self-Service Terminal for pre-verification processing, according to an example embodiment.

FIG. 4 is a diagram of a Self-Service Terminal 400 for pre-verification processing, according to an example embodiment. The SST 400 includes a variety of hardware components and software components. The software components of the SST 400 are programmed and reside within memory and/or a non-transitory computer-readable medium and execute on one or more hardware processors of a hardware device. The SST 400 communicates one or more networks, which can be wired, wireless, or a combination of wired and wireless.

In an embodiment, the SST 400 implements some combination of the processing discussed above with the FIGS. 1A-1B and 2-3.

In an embodiment, the SST 400 implements, inter alia, the method 300 of the FIG. 3.

In an embodiment, the SST 400 interacts, inter alia, with the method 200 of the FIG. 2.

In an embodiment, the SST 400 is a kiosk.

In an embodiment, the SST 400 is a self-service checkout (SSCO).

The SST 400 includes at least one hardware processor 401 and a SST agent 402.

The SST agent 402 is configured to: execute on the processor 401, identify an item of a transaction associated with additional verification of a consumer, notify an external service of the additional verification, request unique data from the consumer in response to instruction from the external service and receiving the unique data from the consumer, provide the unique data to the external service, and continue with the transaction in response to a verification message provided by the external service after providing the unique data.

In an embodiment, the external service is the retail central host 150, where the retail central host 150 communicates with the transaction and service integration platform 130 for performing the additional verification.

In an embodiment, the external service is the transaction and service integration platform 130.

In an embodiment, the external service is the method 200 of the FIG. 2.

In an embodiment, the SST agent 402 is the method 300 of the FIG. 3.

In an embodiment, the SST agent 402 is further configured to: notify the external service that identity validation of the consumer is needed as the additional verification.

In an embodiment, the SST agent 402 is further configured to: notify the external service that age verification of the consumer is needed as the additional verification.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
obtaining, by executable instructions that execute on a processor from a non-transitory computer-readable storage medium, unique data from a consumer in advance of a transaction with a terminal;
verifying, by the executable instructions, identity data for the consumer, in advance of the transaction, based on the unique data, wherein verifying further includes generating a token as the verification message, and wherein generating further includes generating the token as one of: a Near-Field Communication (NFC) code and a Quick Response (QR) code, and wherein generating further includes embedding in the generated verification message one or more of: an indication of a source that was interacted with for matching the unique data to the identity data and a type associated with the identity data;
providing, by the executable instructions, a verification message for at least a portion of the transaction when the transaction is processed on the terminal and after the identity data is verified; and using the verification message as an authentication of a requirement needed to complete the transaction with the terminal.

2. The method of claim 1, wherein obtaining further includes obtaining the unique data after the consumer authenticates to a banking service through a banking service interface processing on a mobile device operated by the consumer.

3. The method of claim 1, wherein obtaining further includes identifying the unique data for obtaining from the consumer based on: a current location of a mobile device being operated by the consumer, a physical location of a Self-Service Terminal (SST) being operated by the consumer for the transaction, and an item associated with the at least a portion of the transaction, wherein the SST is the terminal.

4. The method of claim 1, wherein obtaining further includes obtaining the unique data after requesting a specific type of data from the consumer through a mobile application processing on a mobile device operated by the consumer.

5. The method of claim 1, wherein obtaining further includes obtaining the unique data after requesting a specific type of data from the consumer through a Self-Service Terminal (SST) agent processing on a SST being operated by the consumer during the transaction and when a specific item is identified by the SST as necessitating verification of the identity data for that specific item, wherein the SST is the terminal.

6. The method of claim 1, wherein generating further includes assigning a Time-To-Live (TTL) attribute to the token that expires after an elapsed period of time from a time the token was generated.

7. The method of claim 1, wherein verifying further includes interacting with at least one external system holding the identity data and providing the unique data to the at least one external system for matching to the identity data for the consumer.

8. The method of claim 1, wherein providing further includes providing the verification message to a mobile application processing on a mobile device operated by the consumer.

9. The method of claim 1, wherein providing further includes providing the verification message to a Self-Service Terminal (SST) agent processing on a SST being operated by the consumer during the transaction, wherein the SST is the terminal.

10. A method, comprising:
identifying, by executable instructions that execute on a processor from a non-transitory computer-readable storage medium, an item during a transaction associated with additional verification of a consumer;
notifying, by the executable instructions, an external service of the additional verification;
requesting, by the executable instructions, unique data from the consumer in response to a type of data communicated by the external service and receiving the unique data from the consumer, wherein the unique data is automatically obtained on behalf of the consumer and the consumer established the unique data in advance of the transaction;
providing, by the executable instructions, the unique data to the external service; and
continuing, by the executable instructions, with the transaction after receiving a verification message from the external service indicating that the additional verification has been verified by the external service and using the verification message as an authentication of a requirement needed during the transaction.

11. The method of claim 10, wherein identifying further includes identifying the item as a scanned item having an item code requiring an age verification of the consumer as the additional verification.

12. The method of claim 10, wherein identifying further includes identifying the item as an option selected by the consumer for tendering a check for cashing requiring an identity verification of the consumer as the additional verification.

13. The method of claim 10 wherein requesting further includes receiving the unique data from a mobile device being operated by the consumer.

14. The method of claim 10, wherein requesting further includes receiving the unique data from a peripheral device of a device that processes the method.

15. A Self-Service Terminal (SST), comprising:
a hardware processor; and
a non-transitory computer-readable storage medium having executable instructions;
the executable instructions when executed by the hardware processor from the non-transitory computer-readable storage medium cause the hardware processor to:
identify an item of a transaction associated with additional verification of a consumer;
notify an external service of the additional verification;
request unique data from the consumer in response to instruction from the external service and automatically receive the unique data from the consumer, wherein the consumer established the unique data in advance of the transaction;
provide the unique data to the external service; and
continue with the transaction in response to a verification message provided by the external service after providing the unique data and use the verification message as an authentication of a requirement needed during the transaction.

16. The SST of claim 15, wherein the executable instructions when executed by the hardware processor from the non-transitory computer-readable storage medium further cause the processor to: notify the external service that identity validation of the consumer is needed as the additional verification.

17. The SST of claim 15, wherein the executable instructions when executed by the hardware processor from the non-transitory computer-readable storage medium further cause the processor to: notify the external service that age verification of the consumer is needed as the additional verification.

* * * * *